US008799289B2

(12) United States Patent
Ben Asher et al.

(10) Patent No.: US 8,799,289 B2
(45) Date of Patent: Aug. 5, 2014

(54) SYSTEM AND METHOD FOR CLASSIFYING, PUBLISHING, SEARCHING AND LOCATING ELECTRONIC DOCUMENTS

(75) Inventors: Yosef Ben Asher, Kiryat Tivon (IL); Shlomo Berkovsky, Yokneam Illit (IL)

(73) Assignee: Carmel-Haifa University Economic Corp. Ltd., Mount Carmel (IL)

( * ) Notice: Subject to any disclaimer, the term of this patent is extended or adjusted under 35 U.S.C. 154(b) by 62 days.

(21) Appl. No.: 11/661,860

(22) PCT Filed: Sep. 1, 2005

(86) PCT No.: PCT/IL2005/000934
§ 371 (c)(1),
(2), (4) Date: Mar. 5, 2007

(87) PCT Pub. No.: WO2006/025061
PCT Pub. Date: Mar. 9, 2006

(65) Prior Publication Data
US 2008/0098010 A1    Apr. 24, 2008

Related U.S. Application Data

(60) Provisional application No. 60/606,889, filed on Sep. 3, 2004.

(51) Int. Cl.
*G06F 7/00* (2006.01)
*G06F 17/30* (2006.01)

(52) U.S. Cl.
USPC ............ 707/739; 707/736; 707/737; 707/740

(58) Field of Classification Search
USPC ........................... 707/1, 4, 736, 737, 739, 740
See application file for complete search history.

(56) References Cited

U.S. PATENT DOCUMENTS

| | | | |
|---|---|---|---|
| 6,424,973 B1 * | 7/2002 | Baclawski | 707/102 |
| 2003/0036887 A1 * | 2/2003 | Gibbs et al. | 702/189 |
| 2003/0061028 A1 * | 3/2003 | Dey et al. | 704/9 |
| 2005/0203901 A1 | 9/2005 | Waldvogel et al. | |
| 2005/0278139 A1 * | 12/2005 | Glaenzer et al. | 702/179 |

OTHER PUBLICATIONS

Y. ben-Asher, and S. Berkovsky, Semantic Data Management in Peer-to-Peer E-Commerce Applications, Journal on Data Semantics (JoDS), vol. 6, pp. 115-142, 2006.

* cited by examiner

*Primary Examiner* — Etienne Leroux
*Assistant Examiner* — Jared Bibbee
(74) *Attorney, Agent, or Firm* — Browdy and Neimark, PLLC

(57) ABSTRACT

The present invention provides an electronic documents management system and method for classifying, publishing, searching and locating electronic documents. Electronic documents are classified and published via an ontological description consisting of at least one vector, each vector comprising at least one feature-value pair. Each vector's slot corresponds to a feature and the vector's range of each slot corresponds to the set of all possible values of each feature. In order to classify an electronic document, two hashing functions are applied. A first hashing function maps each feature to a slot number, corresponding to a coordinate in the appropriate vector. A second hashing function maps the value of each pair to a numeric value of a slot, corresponding to the range of each coordinate. The result of the two hashing functions is an ordered vector that can be mapped to a node in hypercube.

22 Claims, 2 Drawing Sheets

SYSTEM AND METHOD FOR CLASSIFYING, PUBLISHING, SEARCHING AND LOCATING ELECTRONIC DOCUMENTS

FIELD OF THE INVENTION

The present invention relates to a system and method for classifying, publishing, searching and locating electronic documents wherein each electronic document is described by one or more feature-value pairs. More specifically, the present invention relates to such system and method applied in a distributed computing environment of a peer-to-peer network.

BACKGROUND OF THE INVENTION

Sharing or providing access to large amounts of electronic documents among an important number of users is a common problem or challenge shared by many computer applications.

It is known in the art to use client-server technology for enabling users to access large amounts of electronic documents or files. The client-server model is typically based on a single or short numbers of servers, to which all users connect. While client-server systems work well under certain conditions, the model has some very obvious limitations and drawbacks.

Client-server environments do not scale smoothly. If the amount of users connected to the server or servers grows dramatically, or the traffic generated grows significantly, without augmenting the server capacity, then the system slows down or may even break down. Augmenting the server capacity is an expensive operation that sometimes requires shutting down the system. Reliability of client-server systems is another frequent problem. If the server breaks down, then the system may be severely crippled or even shut down. Anonymity may also be an issue, as the identity and actions of each client are known to the server.

Peer-to-Peer (P2P) technology, developed in the recent years, offers a solid alternative to the traditional client-server model of computing. In P2P systems, every user (peer) acts as both the client and the server at the same time, and provides a portion of the system capability. P2P systems usually lack a designated centralized management, rather depending on the voluntary contribution of resources by the users. Thus, P2P technology allows a dynamic set of users to efficiently share resources without any centralized management. The shared resources are computing power (e.g., in distributed computation), data (e.g., in large-scale file sharing), bandwidth (e.g., data transfer from multiple sources) and others. As a result, the advantages of P2P technology over the client-server model include roughly unlimited scalability, high privacy and anonymity of the users, and low costs. Sharing and aggregation of the resources guarantees robustness and high availability of P2P systems.

The first generation of P2P systems was based on three classical architectures: mediated P2P architecture, pure P2P architecture, and hybrid architecture. Basically, all of them were designated for a large-scale data sharing. Prior art applications, such as Napster, Freenet and Gnutella, allowed users to download data (mainly multimedia files), shared by other users. Performance of these systems suffered from severe problems. For example, in Napster a cluster of central servers maintained the indices of the files shared by the users. Flooding search algorithm of Gnutella limited the scalability of the system and did not allow proper functioning over a heterogeneous set of users. Freenet, despite being fully decentralized and employing efficient routing algorithms, could not guarantee reliable data location. This led to the development of content-addressable P2P systems.

A number of similar content-addressable P2P systems, such as CAN, Pastry, Chord and some others, are referred as the second generation of P2P systems. They implement highly scalable self-organizing infrastructure for a fault-tolerant routing over distributed hashing basing data management mechanism (DHT). In these systems the users and the data objects are assigned unique identifiers (respectively, userids and keys) from a sparse space. An object is inserted through put(key,userid), and located by get(key) primitives in a bounded number of routing hops.

Prior art routing algorithm of content-addressable systems is based on the Plaxton algorithm. The Plaxton algorithm was not designated for P2P systems, but rather for graphs with a static population. The main idea of Plaxton algorithm is in correcting each time a single digit of address. For example, user 1234 receives a message, addressed to user 1278 (the first two digits of the address already match). The message is forwarded to user 1275 (since there the first three digits will match). To support this routing, each user maintains a data structure of logical neighbors that match i-digits length prefix of its own userid, but differ in the (i+1)th digit. To maintain a connected system with N users, each user is connected to O(logN) neighbors. Since a single digit of address is corrected each time the message is routed, the total length of the routing path is O(logN) hops.

In a P2P implementation of Plaxton algorithm, the routing constantly forwards the message to the user, whose userid is closer to the message key than the current user. Although each of the above DHT-based systems (Pastry, CAN, and Chord) employs slightly different variant of Plaxton routing, they outperform the routing algorithms used in the first generation of P2P systems. Their communication overhead is significantly lower due to the fact that the messages are routed to the relevant users only.

However, DHT-based system rely on the hashing primitives of put(key,userid) and get(key). Thus, one of their major limitations is their support in exact-match searches only. For example, when two similar, but not identical keys $key_1$ and $key_2$ are inserted into the system, the results will usually be different. Therefore only the searches specifying the exact terms mentioned when the key was inserted, will succeed to find it, and an approximated search cannot be operated.

Certain applications such as file sharing, yellow pages, classifieds, dating services, bulletin boards and others, allow users to publish electronic documents and also search for electronic documents. Frequently, electronic documents are classified and searched for according to predetermined criteria imposed by the service provider or application.

For example, a yellow-pages classifieds type application requires dynamic management (i.e., insertion and search) of general-purpose E-Commerce advertisements (ads). Its infrastructure needs to be capable of managing E-Commerce ads of both supply and demand types. Supply ads are ads, where the users offer a product or a service in exchange for a payment, whereas in demand ads the users generally seek for a product or for a service provided by other users. The main functionality of the system is to identify matching between appropriate demand and supply ads. This is further to referred as publish-locate functionality.

In common E-Commerce systems, a user publishing or searching for an ad, is usually required to fill-in a predefined form describing the matter of the ad. For example, a user searching a car ad can be asked to fill-in a form containing basic fields such as manufacturer name, geographical location, and price range. More sophisticated systems can ask a user to fill-in a complicated form containing more fields such as the manufacturer name, model, range of production years, gearbox type, engine volume and number of previous owners.

This approach, exploiting predefined forms containing a set of features or attributes describing the objects, is further referred to as ontology-based approach. Ontology is a formal explicit specification of a particular domain. It provides both human-understandable and machine-processable mechanisms, allowing enterprises and application systems to collaborate in a smart way. Thus, the set of attributes describing the objects from a particular domain is considered as the ontology of a domain, whereas the attributes are the slots of the ontology.

HyperCup has proposed a flexible ontology-based hypercube topology for P2P data management. It used global predefined ontology to classify users as providers of particular information associated with the ontology slots. This classification determined the position of the user in the hypercube and allowed location of any desired information in a bounded number of steps through a semantic routing. Thus, HyperCup formed an alternative to distributed hashing, flooding, local routing tables and other fundamental search techniques in P2P. Additionally, HyperCuP proposed decentralized algorithms, capable of constructing and maintaining connected hypercube graph, stable to dynamic joins and departures of users.

In HyperCup, the users are connected in a hypercube-like P2P structure, chosen due to its logarithmic diameter, increased fault tolerance and the symmetry guaranteeing equal load of the users. The hypercube dimension d and the range of possible values in the dimensions (further referred to as the coordinates range) k determine the maximal number of users connected to the hypercube. A complete hypercube contains at most $N_{max}=k^d$ users, where every user is connected to k−1 logical neighbors in each dimension, resulting in $N_n=(k-1) \cdot d$ neighbors. This topology generates a symmetric structure where the load of the users in the system is similar, as each user holds roughly equal functionality.

Any edge in the hypercube, connecting a pair of adjacent users X and Y, is assigned a numeric value, referred to as rank. When a node Y is a logical neighbor of X over a dimension i, the rank of the edge connecting X and Y is i. Thus, the edges rank ranges from 0 to d−1. Any user T in the hypercube can act as an initiator of search or broadcast operation which is performed as follows: the message jointly with the rank of the connecting edge is sent to all the neighbors of the initiating user T. Upon receiving a message, users forward it only over the edges, whose ranks are higher than the rank of the edge the message was received from. This guarantees that each user in the graph will receive a message exactly once, and also that any connected user will be reached in O(d) routing hops.

The following example refers to a hypercube with a dimension d=3 and the coordinates range k=2. Eight users numbered from 1 to 8 are connected and form a complete hypercube. Each user is connected to exactly d=3 logical neighbors, and the ranks of the connecting edges are 0, 1, or 2. For example, in respect to user 8, user 1 is regarded as 0-neighbor, user 3 is 1-neighbor, and user 4 is 2-neighbor. Let user 8 be the initiator of the broadcast operation. The messages are sent to the neighbors, i.e., users 1, 3 and 4. Upon receiving a message over 0-rank edge, user 1 forwards it to 1- and 2-neighbors, i.e., users 2 and 5. User 3 forwards it to 2-neighbor, user 6, and this broadcast through "higher-rank forwards" continues until all the nodes in the hypercube are reached. Obviously, no node receives the broadcasted message more than once, and the longest path in this hypercube is d=3 hops long.

HyperCup also proposes a dynamic P2P algorithm for hypercube construction and maintenance. The algorithm is based on the idea that a user can manage not just a single, but also a number of nodes in the hypercube graph. This is required in order to simulate the missing users in the topology of the next complete hypercube, maintained in any topology state. For example, node 4 can simulate three missing nodes of the hypercube. The simulations are noted by the dashed edges 1-4, 2-4 and 3-4, as node 4 acts as a logical neighbor of nodes 1, 2 and 3.

When a new user connects the network, he takes his place (according to the data provided) in the next complete hypercube, releases the user that previously managed the node and starts functioning as a real hypercube node. For example, if a new user that should be positioned at node 5 is connected, it is routed to one of the logical neighbors of node 5, i.e., users maintaining the nodes 1 or 4. As the location of node 5 is simulated by the user maintaining node 4, the new user contacts the user of node 4, builds a real edge between them and takes part of its functionality, i.e., builds a real edge with node 1 and starts simulating the neighbor of node 2.

When a user disconnects, one of the remaining neighbors takes the responsibility for the node, previously managed by the leaving user. Since the next complete hypercube is constantly maintained, previously discussed broadcast and search operations are not affected by sporadic joins and departures of users.

As already stated, users are classified as providers of a particular content. A single predefined ontology defining the domain semantics inherently organizes the users providing the same or similar contents in concept clusters through the above construction and maintenance algorithm. This facilitates querying the generated topology and efficiently routing the queries through the above routing algorithm. Note that when a query is built as a logical combination of the ontology slots, it is routed only to the users that can potentially answer it.

The following simple ontology of cars domain, can be used to construct a 3-dimensional HyperCuP (FIG. 1): dimension 0 distinguishes between manual(0), semi-automatic(1) and automatic(2) gearbox, dimension 1 stands for USA(0) or non-USA(1) produced cars, and dimension 2 for metallic(0) or non-metallic (0) color of the car. Clearly, a query for automatic car produced in the USA is routed to nodes 1 and 5, as only those node stores the requested class of cars.

However, HyperCup approach requiring predefined ontologies is applicable only to a limited set of domains and is inappropriate for a general-purpose E-Commerce system, implying dynamic and a-priori unknown set of objects. A possible solution might be allowing users to add new types of ontological forms. However, this will flood the system with multiple (partially similar and overlapping) ontologies. A negative example can be a setting where a user publishing an object and a user looking for the same object are using slightly different ontologies. Another solution might be developing a single comprehensive ontology, comprising as many domain ontologies as possible. However, projecting this ontology on the hypercube will result in a huge, sparse and barely manageable structure. Moreover, sharing of the single ontology by all the users will obstruct it from being expanded.

All these restrictions contradict the decentralized spirit of P2P networks and raise a need for developing a flexible mechanism for managing a dynamic set of ontologies. It would be desirable to have a system where the ontology could be only partially defined, and parts of it could be dynamically specified by the users. Looking at the previous example of a classifieds system, it would be desirable to enable a user to insert any new classification that he deems appropriate, for example, GPS system, DVD, etc., and on the other hand let users also search for any classification that they deem appropriate.

SUMMARY OF THE INVENTION

The present invention relates to an electronic documents management system and provides a system for classifying, publishing, searching and locating electronic documents, said system comprising:
  i. means for classifying and publishing electronic documents via an ontological description consisting of at least one vector, each vector comprising at least one feature-value pair wherein each slot of said at least one vector corresponds to a feature of said at least one feature-value pair and a range of each of said slots corresponds to a set of all possible values of said feature;
  ii. means for storing each of said electronic documents using the following steps:
    using a first hashing function to map said feature of each feature-value pair to a slot number, corresponding to a coordinate in said at least one vector;
    using a second hashing function to map said value of each feature-value pair to a numeric value of said slot corresponding to the range of said coordinate;
    creating a new ordered vector based on the results of said two hashing functions;
    mapping said new ordered vector to a node in hypercube;
  iii. means for storing each of said electronic documents in a hypercube-like graph structure wherein each vertex of said hypercube can be recursively constructed of another hypercube;
  iv. means for specifying search criteria for one or more electronic documents via an ontological description by enumerating at least one feature-value pair; and
  v. means for locating said one or more electronic documents according to the specified search criteria.

Multiple vectors can be organized in a hierarchical multi-layered structure. Electronic documents are stored in a hypercube-like graph structure wherein each vertex can be recursively constructed of another hypercube. Search criteria can be specified for one or more documents via an ontological description by enumerating at least one feature-value pair. The electronic document or documents are then located according to the specified search criteria.

In a preferred embodiment of the present invention, electronic documents are distributed across multiple computers connected by a peer-to-peer network. The ontological description employed to publish or locate electronic documents consists of a global, predefined part and optionally an unspecified part dynamically specified by the system's users. The terms used in the ontological description of the electronic documents can undergo a semantic standardization in order to increase the performance of the system.

The present invention further provides a method for classifying, publishing and locating of electronic documents, the method comprising the steps of:
  i. classifying and publishing electronic documents via an ontological description consisting of at least one vector, each vector comprising at least one feature-value pair wherein each slot of said vector corresponds to a feature of said at least one feature-value pair and a range of each of said slots corresponds to a set of all possible values of said feature;
  ii. storing each of said electronic documents using the following steps:
    using a first hashing function to map said feature of each at least one feature-value pair to a slot number, corresponding to a coordinate in said at least one vector;
    using a second hashing function to map said value of each value-feature pair to a numeric value of said slot corresponding to the range of said coordinate;
    creating a new ordered vector based on the results of said two hashing functions;
    mapping said new ordered vector to a node in hypercube;
  iii. storing each of said electronic documents in a hypercube-like graph structure wherein each vertex of said hypercube can be recursively constructed of another hypercube;
  iv. specifying search criteria for one or more electronic documents via an ontological description by enumerating at least one feature-value pair; and
  v. locating said one or more documents according to the specified search criteria.

DETAILED DESCRIPTION OF THE INVENTION

Figure 1:
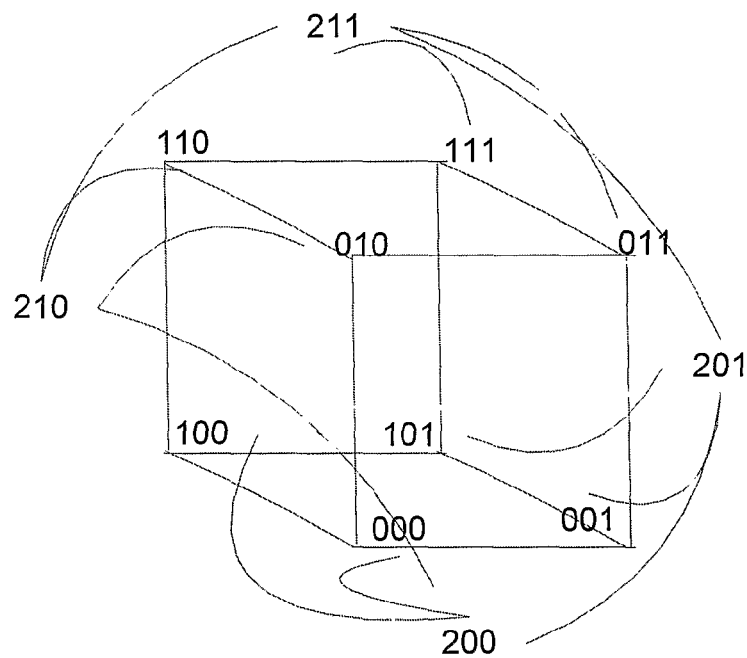
FIG. 1 illustrates an example of a 3-dimensional HyperCup as known in the art.

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The present invention solves the problem of constructing a global data structure or ontology that should on one hand grow dynamically with no limited range, and on the other hand be used and updated in a fully distributive way. An ontology can be characterized as a data structure. Any ontology can be viewed as a vector, whose slots correspond to the features of the object being described, and the range of each slot is the set of all possible values of this feature.

For example, current applications can use a simple specified ontology for electronic documents in the cars domain where the object of said electronic documents is described by a vector containing three slots [manufacturer|engine volume|year of production]. Each slot has the following range of values [{Ford, Mercedes, Jaguar}|{1000-1500, 1500-2000, 2000-2500}|{1990+, 2000+, new}]. The semantic P2P system, based on this ontology, will consist of a hypercube of at most 27 vertices, each having up to 6 neighbors.

According to the present invention, a generalization of ontology to an unspecified ontology is performed as follows:

The range of possible slot values can be made unlimited by operating a hashing function on the values of each slot, instead of defining a set of fixed values. For example, in the previous specified ontology we can use hashing to a range of size three, mapping the values to their locations, e.g., [BMW|3000|1987] will be mapped to [hash(BMW)|hash (3000)|hash(1987)]. Consequently, the same 3-dimensional cube can be used to hold the items, whose values were not anticipated by the slots of a fixed ontology, and each user can now independently insert new items in a fully distributive way.

The list of vectors can dynamically grow by letting the peers expand the ontology. In one embodiment of the present invention, the system can dynamically add a new vector by expanding the ontology of the electronic document. An unspecified vector (namely, a new vector added to the ontology of the electronic document) can be defined as a list of pairs $feature_i$:$value_i$. Two different hash functions are used to map an unspecified vector to the hypercube: one to map the $feature_i$ to a slot number (coordinate in a hypercube), and another one to map the $value_i$ to a numeric value of a slot.

According to one aspect of the present invention, the system includes means to dynamically add a new vector by:
   i. defining said new vector by a list of at least one feature-value pairs;
   ii. using a first hashing function to map said feature of each pair to a slot number, corresponding to a coordinate in said vector;
   iii. using a second hashing function to map said value of each pair to a numeric value of said slot corresponding to the range of said coordinate;
   iv. creating a new ordered vector based on the results of said two hashing functions;
   v. mapping said new ordered vector to a node in the hypercube; and
   vi. connecting said new ordered vector to all existing ordered vectors in the same hypercube, wherein all coordinates but one are equal, and wherein the single different coordinate between said inserted ordered vector and said existing ordered vectors is one unit higher or lower.

For example, an electronic document using an unspecified vector in cars ontology can be [Ford|1600|2000]+[location: LA|gear:automatic]. The unspecified vector will be placed in the hypercube by applying hash1(location) and hash1(gear) to obtain the coordinates in the hypercube, and hash2(LA) and hash2(automatic) will determine the value in each coordinate. Using two hash functions allows ignoring the order of the unspecified slots in any given vector. This example illustrates how the system of the invention contains an ontological description consisting of a global, predefined part and optionally an unspecified part dynamically specified by the system's users. In the above example, the global predefined part consisted of [manufacturer|engine volume|year of production], and the user dynamically added an unspecified part [location|gear].

The application of the two hashing functions can be illustrated by the following example. Assuming a vector with three coordinates 0,1,2 with range of 0.4, and a set of pairs {<animal:cat>,<color:red>,<food:hotdogs>}. The pairs do not have to be ordered. Applying as described for each pair two hash functions, one on the feature and one the value, yields the following results:
   hash1("animal")=2; hash2("cat")=4
   hash1("color")=0; hash2("red")=3
   hash1("food")=1; hash2("hotdogs")=2

Looking at the results we see that coordinate 0 (color) has the value of 3 (red), coordinate 1 (food) has the value of 2 (hotdogs), and coordinate 2 (animal) has the value of 4 (cat), yielding the ordered vector [3,2,4]. This ordered vector can now be mapped to the node [3,2,4].

According to the invention, each node can communicate with all existing nodes in the same hypercube sharing the same coordinates but one, and wherein the single different coordinate between said node and said existing nodes is higher or lower by one unit.

Going back to the example above, node [3,2,4] in the hypercube is connected to all users that have inserted electronic documents that have been mapped to any of the neighboring vectors, and wherein all coordinates but one are equal, and wherein the single different coordinate is high or lower by one unit:
   1. [4,2,4] first coordinate increased by 1
   2. [2,2,4] first coordinate lower by 1
   3. [3,3,4] second coordinate increased by 1
   4. [3,1,4] second coordinate lower by 1
   5. [3,2,0] third coordinate increased by 1
   6. [3,2,3] third coordinate lower by 1

Figure 2:
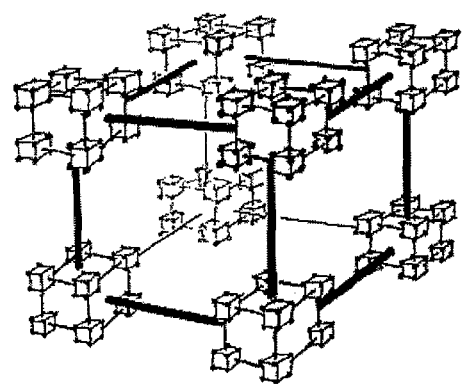
FIG. 2 illustrates a Multi-Layered Hypercube (MLH) of the invention.

The present invention enables multiple vectors to be organized in a hierarchical, multi-layered structure, instead of one flat vector, constructing the underlying semantic hypercube, whose vertices recursively contain other hypercubes. This structure is defined as a multi-layered hypercube (MLH). For example, a 3-layered ontology with three vectors [a|b|c]+[d|e|f]+[g|h|i] with two possible values for each slot will generate a hypercube with 8 vertices where each vertex recursively holds an additional sub-cube as shown in FIG. 2. This should be compared to 512-vertices hypercube, had we used prior art one flat vector for the whole ontology.

According to the present invention, every user can mention a different number of the unspecified pairs. When an unspecified vector is mapped to an existing hypercube, its slots are extended to the maximal dimension of the MLH. For example, going back to the car example described above, the unspecified vector [location:LA] is extended to, say, [location.LA|gear:*], when it is inserted to a 2-dimensional hypercube. The symbol * represents the regular expression for any possible value. If the inserted unspecified vector has more slots than the number of dimensions in the current MLH, all the vectors in the relevant sub-cube are expanded.

In another example, a sample electronic document is described as:
   {<animal:cat>,<color:red>,<food:hotdogs>}
   {<sound:meow>,<water:hate>,<price:free>}

The two vectors, after applying a hash function to each feature and value, return the following numeric vectors:
   [3,2,4]
   [1,1,4]

The first vector maps the electronic document to the main hypercube at node [3,2,4]. This node is a pointer to another sub-cube dealing among the rest with red cats that love hotdogs. The electronic document is mapped to node [1,1,4] in the second hypercube, representing things that make a sound of meow, hate water and come for free. The neighbors of node [1,1,4] in the second hypercube are node/users-electronic documents [0,1,4], [2,1,4], [1,0,4], [1,2,4], [1,1,0], [1,1,3]

Other electronic documents whose first vector has been mapped to [3,2,4] will also point to this second sub-cube [1,1,4].

The present invention allows a user to search for previously classified and stored electronic document by specifying appropriate search criteria. The search criteria are presented in the form of a list containing one or more feature-value pairs. The system then proceeds to locate the desired electronic document by classifying the search criteria, and then retrieving the electronic document based on the location of the user in the P2P network.

According to the invention, searching for an electronic document mapped to a target node is accomplished using the following steps:

i. starting with a base node in the first hypercube, wherein the base node communicates with a second, subsequent node whose coordinates are all but one equal to said base node, and whose single different coordinate is higher or lower by one unit;
ii. each subsequent node communicates in its turn with another subsequent node, sharing all coordinates but one, until it reaches a matching node whose first vector matches the first vector of the target node;
iii. if the target node has another vector, then said matching vector points to a following hypercube node, that in its turn communicates with a subsequent node, again by incrementing a single coordinate by one unit; and
iv. step (iii) is repeated until the target node is reached.

For example, a user has inserted an electronic document describing white dogs that like hamburgers, and in addition bark, like water and are inexpensive to purchase. The user specified the following attributes and values:
{<animal:dog>,<color:white>,<food:hamburgers>}
{<sound:bark>,<water:like>,<price:inexpensive>}

After applying the appropriate hash function on each feature and on each value, the target electronic document is mapped to the following node:
[2,0,3]
[0,0,3]

The user is then connected to the above node. If the user wants to search for red cats that like hotdogs and in addition meow, hate water and come for free, then based on the example above, the search criteria will be mapped to:
[3,2,4]
[1,1,4]

According to the invention, when a user publishes an electronic document, said electronic document is stored in the user's computing device. According to another aspect of the invention, a user can be connected to any arbitrary node in the system in order to be able to reach any electronic document with known coordinates. When a new electronic document mapped to <x1,x2,x3> is inserted into a hypercube, the inserting user must know/store the electronic addresses of each electronic document that has been mapped to a neighboring node, e.g., <(x1+1),x2,x3>, <x1,(x2+1),x3>, <x1,x2,(x3−1)>. The addition of 1 to $x_i$ is done in Modulus range. Similarly all the neighboring nodes/users need to know/store the electronic address of this newly added node. Thus, according to the invention, it is sufficient to be connected (know the electronic address) of any node in the hypercube in order to initiate a routing process through neighboring nodes.

The user must be connected (know how to communicate) to all users responsible for electronic documents that have one coordinate changed, through which he can reach the target electronic document. There are more than one possible travel patterns from one node to another. The different patterns may be tried sequentially until one is successful, simultaneously in order to increase the speed of search (assuming the system can handle the burden of more parallel searches), or according to any defined algorithm balancing the system's performance and reliability.

An example of one such possible path is described bellow. First, starting with the main hypercube:

| [2, 0, 3] ==> | [3, 0, 3] ==> | [3, 1, 3] ==> | [3, 2, 3] ==> | [3, 2, 4] |
|---|---|---|---|---|
| [0, 0, 3] | [4, 4, 4] | [4, 1, 1] | [0, 2, 2] | [0, 0, 3] |

In this example (top row) the user travels the main hypercube from [2,0,3] until he reaches the node [3,2,4] by each time increasing or decreasing a single coordinate by one unit.

Once the user reaches node [3,2,4] [0,0,3] he then moves on to search the second hypercube (bottom row):

| [3, 2, 4] | [3, 2, 4] | [3, 2, 4] | [3, 2, 4] |
|---|---|---|---|
| [0, 0, 3] ==> | [1, 0, 3] ==> | [1, 1, 3] ==> | [1, 1, 4] |

Again, the user travels the second hypercube from node [0,0,3] until he reaches node [1,1,4].

The final node reached, [3,2,4] [1,1,4] then points to all red cats that love hotdogs and in addition meow, hate water and come for free.

In order to distinguish between different objects having the same features or attributes (e.g., both cars and bicycles have attributes such as color, wheels_type, number_of_gears etc. . . . ), the present invention requires the ontological descriptions to contain so-called universal, or specified slots. A slot is referred as universal if it can be applied to as many objects as possible, and its values form a meaningful separation between any two objects. For example, a universal attribute useful to separate between many objects is size, reflecting the estimated size of the object as compared to a well known standard. This allows distinguishing between the descriptions of cars and bicycles having the same attributes.

At least one $feature_i$:$value_i$ pair in a description of an electronic document must be a discriminative feature, i.e., it should be unique for any given object. Examples of discriminative features include the Internet Protocol (IP) address of the user, user id, or an ID number of classified ad. This allows two ads (either identical or distinct but mapped to the same node) to be separated according to the value of the discriminative attribute.

Figure 3:
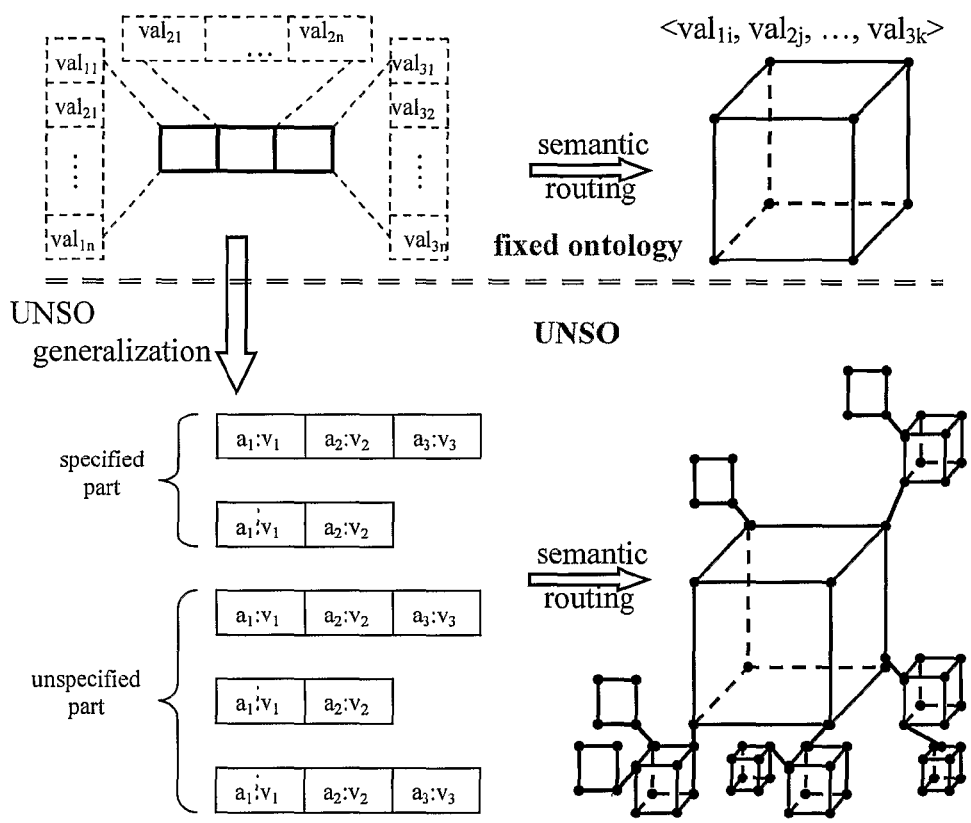
FIG. 3 illustrates a generalization of extending a fixed specified ontology to a dynamic unspecified ontology according to the invention.

FIG. 3 summarizes the above-mentioned ways of extending a fixed specified ontology to the Unspecified Ontology (UNSO) according to the invention. In a fixed ontology, a predefined set of slots (attributes) and values is mapped to the location in the underlying hypercube graph. On contrary, in UNSO, the number of $feature_i$:$value_i$ pairs in the unspecified part of the ontological description is unlimited. Thus, UNSO dynamically generates a hypercube-like graph structure, where each vertex is recursively constructed of another hypercube.

In one embodiment of the present invention, electronic documents are distributed across multiple computers connected by a peer-to-peer network. Every peer or node in the P2P network can be used to store and publish an electronic document and also to search for and retrieve an electronic document.

In another embodiment of the present invention, terms used in the ontological description of electronic documents undergo a semantic standardization so that close or identical terms used can all point to the same object. For example, the terms car, auto, automobile or vehicle may all be chosen by different users to describe the same object, and thus after a semantic standardization will all point to the same object.

The present invention enables multiple vectors to be organized in a hierarchical, multi-layered structure, instead of one flat vector, constructing the underlying semantic hypercube, whose vertices recursively contain other hypercubes. In one embodiment of the present invention, the decision in which hypercube to place each feature is achieved according to a predetermined method. Features that are queried more frequently can be found faster, or require fewer resources to locate and retrieve, if placed in the initial hypercube or closer to the initial hypercube. Electronic documents containing these features can thus be located and retrieved with a reduced number of hops. Since the dimension of each predefined hypercube cannot be changed, the decision in which hypercube to place each feature can have a significant impact on the system's performance.

One implementation of said predetermined method is by applying a statistical analysis on queried search criteria and results, in order to identify popular attribute and place them in a more favorable location, so that electronic documents associated with said popular attributes can be located and retrieved using a reduced number of hops. The statistical analysis can be done with each operation or in regular or irregular intervals.

In another implementation of said predetermined method, features that are estimated by an expert in the field related to the electronic documents to be more popular are placed in a more favorable location, so that electronic documents associated with said popular attributes can be located and retrieved using a reduced number of hops.

In yet another embodiment of the present invention, the system does not require an input of a list composed of one or more feature-value pairs in order to describe an electronic document, but rather accepts electronic documents without an associated ontological description. The system then includes means for analyzing the contents of each electronic document, and deducing or constructing the associated attribute-value pair or pairs. For example, a classifieds advertising saying "2002 Ford Mustang, automatic, 45,000 miles", can be analyzed to produce the following ontology [Manufacturer:Ford|Model:Mustang|Year:2002|Mileage:45000].

According to the invention, constructing the ontology, based on the free text content of a new electronic document, is achieved using the following steps:

(i) reviewing the contents of said new electronic document and returning a vector of the keywords (values) (K1, . . . , Kn) of said new electronic document, wherein said keywords are arranged according to a predetermined order;

(ii) reviewing by an expert of a representative set of electronic documents D1, D2, . . . $D_i$ and classifying each of said representative set of electronic documents in two UNSO's U1, U2 where: U1 is the regular UNSO of said electronic document $D_i$, U1 describing the way said expert assumes most users will search for such representative set of electronic documents; and U2 is an UNSO obtained by ordering the keywords (values) obtained from electronic document $D_i$ for example [1:K1,2:K2,3:K3], [4:K4,5:K5,I:$K_i$];

(iii) storing said UNSO's U1 and U2 for each one of said representative set of electronic documents in respective multi-layered hypercubes MLH1 and MLH2;

(iv) constructing by said expert of a function $D_i$.f associated with each one of said representative set of electronic documents, said function describing how to construct a matching ontology $D_i$U1 from the keywords (values) of $D_i$U2;

(v) using the keywords (values) obtained from said new electronic document (K1, . . . , Kn) in order to search for a similar electronic document $D_i$ in MLH2 among said representative set of electronic documents; and (vi) applying the associated function $D_i$.f of said similar electronic document $D_i$ in order to construct the appropriate ontology U1 for new electronic document $D_i$.

In one embodiment of the invention, after the expert has completed reviewing the representative set of electronic documents, new electronic documents can be inserted into MLH1 by users, without specifying any ontology. A user can also search for any electronic document by filling the desired features according to U1, and retrieving all relevant electronic documents.

In another embodiment of the present invention, the system is built to manage a classifieds, yellow pages-type application, wherein the electronic documents are general purpose e-commerce advertisements to classify, publish, search and locate products or services or both.

In still another embodiment of the present invention, the system is built for data mining purposes. Data mining can be defined as the process of finding correlations or patterns among a large number of fields or attributes in large data repositories. The invention allows users to analyze data from many different dimensions or angles, categorize it, and summarize the relationships identified into useful information—information that can be used to increase revenue, cut costs, or both.

In yet another embodiment of the present invention, the system is built to enable publication, search and retrieval of electronic documents selected from the group consisting of: music files, pictures, video files, computer programs, newspaper articles, electronic books, blogs, personals ads, and books.

Although the invention has been described in detail, nevertheless changes or modifications which do not depart from the teachings of the present invention will be evident to those skilled in the art. Such changes and modifications are deemed to come within the purview of the present invention and the appended claims.

The invention claimed is:

1. A computerized system for classifying, publishing, searching and locating electronic documents, said system comprising:

(i) means for classifying and publishing electronic documents via an ontological description consisting of at least one vector, each vector comprising at least one feature-value pair wherein each slot of said at least one vector corresponds to a feature of said at least one feature-value pair and a range of each of said slots corresponds to a set of all possible values of said feature;

(ii) means for storing each of said electronic documents in an electronic storage comprising:

means for using a first hashing function to map said feature of each feature-value pair to a slot number, corresponding to a coordinate in said at least one vector;

means for using a second hashing function to map said value of each feature-value pair to a numeric value of said slot corresponding to the range of said coordinate;

means for measuring distances in a hypercube between two vectors by using said second hashing function to order the feature of each vector and then using said first hashing function to order the values of each vector and then applying a threshold operation on the vectors to measure their distance;

means for creating a new ordered vector based on the results of said two hashing functions and the calculated distances; and means for mapping said new ordered vector to a node in a hypercube based on calculated distances;

(iii) means for storing each of said electronic documents in a hypercube-like graph structure wherein each vertex of said hypercube can be recursively constructed of another hypercube;

(iv) means for specifying search criteria for one or more electronic documents via an ontological description by enumerating at least one feature-value pair;
  (i) means for locating said one or more electronic documents according to the specified search criteria; and
  (ii) means users of said system to dynamically add and search new search criteria for electronic documents, said new search criteria comprising new features not previously defined by the system.

2. The system according to claim 1, wherein said electronic documents are distributed across multiple computers connected by a peer-to-peer network.

3. The system according to claim 1, wherein said ontological description consists of a global, predefined part and optionally an unspecified part dynamically specified by the system's users.

4. The system according to claim 1, wherein terms used in said ontological description of said electronic documents undergo semantic standardization.

5. The system according to claim 1, wherein the range of each possible slot values is made unlimited by operating a hashing function on the values of each slot.

6. The system according to claim 1, further including means to dynamically add a new vector by expanding said ontology.

7. The system according to claim 6, wherein said means to dynamically add a new vector include:
  (i) means for defining said new vector by a list of at least one feature-value pairs;
  (ii) means for using a first hashing function to map said feature of each pair to a slot number, corresponding to a coordinate in said vector;
  (iii) means for using a second hashing function to map said value of each pair to a numeric value of said slot corresponding to the range of said coordinate;
  (iv) means for creating a new ordered vector based on the results of said two hashing functions;
  (v) means for mapping said new ordered vector to a node in the hypercube; and
  (vi) means for connecting said new ordered vector to all existing ordered vectors in the same hypercube, wherein all coordinates but one are equal, and wherein the single different coordinate between an inserted ordered vector and said existing ordered vectors in one unit higher or lower.

8. The system according to claim 1, wherein each node can communicate with all existing nodes in the same hypercube sharing the same coordinates but one, and wherein the single different coordinate between said node and said existing nodes is higher or lower by one unit.

9. The system according to claim 1, wherein searching for an electronic document mapped to a target node is accomplished using the following steps:
  (i) starting with a base node in the first hypercube, wherein the base node communicates with a second, subsequent node whose coordinates are all but one equal to said base node, and whose single different coordinate is higher or lower by one unit;
  (ii) each subsequent node communicates in its turn with another subsequent node, sharing all coordinates but one, until it reaches a matching node whose first vector matches the first vector of the target node;
  (iii) if the target node has another vector, then said matching vector points to a following hypercube node, that in its turn communicates with a subsequent node, again by incrementing a single coordinate by one unit; and
  (iv) step (iii) is repeated until the target node is reached.

10. The system according to claim 1, wherein the decision in which hypercube to place each feature is achieved according to a predetermined method.

11. The system according to claim 10, wherein features that are estimated to be queried more frequently are placed in the initial hypercube or closer to the initial hypercube in order to reduce the number of hops required to reach electronic documents retrieved using more popular search criteria.

12. The system according to claim 10, wherein said predetermined method consists of statistical analysis of the system's search criteria and results in order to reduce the number of hops required to reach said electronic documents retrieved using more popular search criteria.

13. The system according to claim 1, wherein documents are published without an associated ontological description, and wherein the system includes means of analyzing the contents of said electronic documents in order to deduce its associated one or more feature-value pairs.

14. The system according to claim 13, wherein said means comprise:
  (i) means for reviewing the contents of said new electronic document and returning a vector of the keywords (values) ($K1, \ldots, Kn$) of said new electronic document, wherein said keywords are arranged according to a predetermined order;
  (ii) means for reviewing by an expert of a representative set of electronic documents $D1, D2, \ldots Di$ and classifying each of said representative set of electronic documents in two unspecified ontologies $U1, U2$ where: $U1$ is the regular unspecified ontology of said electronic document $Di$, $U1$ describing the way said expert assumes most users will search for such representative set of electronic documents; and $U2$ is an unspecified ontology obtained by ordering the keywords (values) obtained from electronic document $Di$;
  (iii) means for storing said unspecified ontologies $U1$ and $U2$ for each one of said representative set of electronic documents in respective multi-layered hypercubes $MLH1$ and $MLH2$;
  (iv) means for constructing by said expert of a function $Di.f$ associated with each one of said representative set of electronic documents, said function describing how to construct a matching ontology $DiU1$ from the keywords (values) of $DiU2$;
  (v) means for using the keywords (values) obtained from said new electronic document ($K1, \ldots, Kn$) in order to search for a similar electronic document $Di$ in $MLH2$ among said representative set of electronic documents; and
  (vi) means for applying the associated function $Di.f$ of said similar electronic document $Di$ in order to construct the appropriate unspecified ontology $U1$ for new electronic document $Di$.

15. The system according to claim 1, wherein said electronic documents are general purpose e-commerce ads for publishing and searching for articles or services.

16. The system according to claim 1, used for data mining applications.

17. The system according to claim 1, wherein said electronic documents contain at least one electronic document selected from the group consisting of: music files, pictures, video files, computer programs, newspaper articles, electronic books, blogs, personals ads, and books.

18. A computerized method for classifying, publishing, searching and locating electronic documents, the method comprising the steps of:
- (i) classifying and publishing electronic documents via an ontological description consisting of at least one vector, each vector comprising at least one feature-value pair wherein each slot of said vector corresponds to a feature of said at least one feature-value pair and a range of each of said slots corresponds to a set of all possible values of said feature;
- (ii) storing each of said electronic documents in an electronic storage using the following steps:
  - using a first hashing function to map said feature of each at least one feature-value pair to a slot number, corresponding to a coordinate in said at least one vector;
  - using a second hashing function to map said value of each value-feature pair to a numeric value of said slot corresponding to the range of said coordinate;
  - measuring distances in a hypercube between two vectors by using said second hashing function to order the features of each vector and then using said first hashing function to order the values of each vector and then applying a threshold operation on the vectors to measure their distance;
  - creating a new ordered vector based on the results of said two hashing functions and the calculated distances;
  - mapping said new ordered vector to a node in hypercube based on the calculated distances;
- (iii) storing each of said electronic documents in a hypercube-like graph structure wherein each vertex of said hypercube can be recursively constructed of another hypercube;
- (iv) specifying search criteria for one or more electronic documents via an ontological description by enumerating at least one feature-value pair; and
- (v) locating said one or more documents according to the specified search criteria.

19. The method according to claim 18, wherein a new vector is added dynamically by expanding said ontology, comprising the following steps:
- (i) defining said new vector by a list of at least one feature-value pairs;
- (ii) using a first hashing function to map said feature of each pair to a slot number, corresponding to a coordinate in said vector;
- (iii) using a second hashing function to map said value of each pair to a numeric value of said slot corresponding to the range of said coordinate;
- (iv) creating a new ordered vector based on the results of said two hashing functions;
- (v) mapping said new ordered vector to a node in the hypercube; and
- (vi) connecting said new ordered vector to all existing ordered vectors in the same hypercube, wherein all coordinates but one are equal, and wherein the single different coordinate between an inserted ordered vector and said existing ordered vectors is one unit higher or lower.

20. The method according to claim 18, wherein searching for an electronic document mapped to a target node is accomplished using the following steps:
- (i) starting with a base node in the first hypercube, wherein the base node communicates with a second, subsequent node whose coordinates are all but one equal to said base node, and whose single different coordinate is higher or lower by one unit;
- (ii) each subsequent node communicates in its turn with another subsequent node, sharing all coordinates but one, until it reaches a matching node whose first vector matches the first vector of the target node;
- (iii) if the target node has another vector, then said matching vector points to a following hypercube node, that in its turn communicates with a subsequent node, again by incrementing a single coordinate by one unit; and
- (iv) step (iii) is repeated until the target node is reached.

21. The system according to claim 1, wherein said system is implemented on a computing device and said means for storing comprises a computer-readable medium in which said electronic documents are stored.

22. The method according to claim 18, wherein said method is implemented on a computing device and said step of storing stores said electronic documents on a computer-readable medium.

* * * * *